C. HOLTON.
NUT-LOCK.
No. 176,634. Patented April 25, 1876.
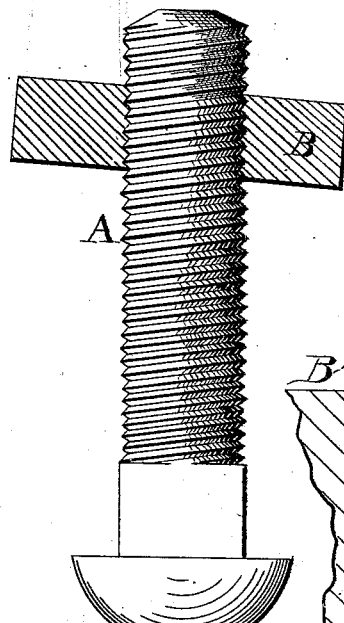
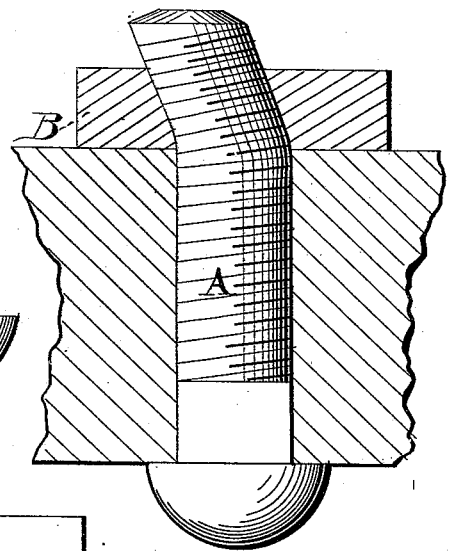
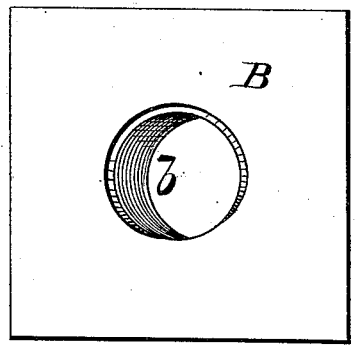
WITNESSES
Franck L. Ouland
C. L. Evest.
INVENTOR
Cassius Holton
By Alexander Mason
Attorneys

UNITED STATES PATENT OFFICE.

CASSIUS HOLTON, OF READING, PENNSYLVANIA, ASSIGNOR TO FRANCIS HICKMAN, OF SAME PLACE.

IMPROVEMENT IN LOCK-NUTS.

Specification forming part of Letters Patent No. 176,634, dated April 25, 1876; application filed January 22, 1876.

*To all whom it may concern:*

Be it known that I, CASSIUS HOLTON, of Reading, in the county of Berks and in the State of Pennsylvania, have invented certain new and useful Improvements in Lock-Nuts; and do hereby declare that the following is a full, clear, and exact description thereof, reference being had to the accompanying drawings and to the letters of reference marked thereon, making a part of this specification.

My invention relates to devices for locking nuts on bolts and it consists in combining with an ordinary bolt a nut having an inclined threaded hole, so that when the nut is screwed up tightly, and lies flat against its bearing-surface, the end of the bolt will be bent on the same incline as the hole in the nut, as will be hereinafter more fully set forth.

In order to enable others skilled in the art to which my invention appertains to make and use the same, I will now proceed to describe its connection and operation, referring to the annexed drawing; in which—

Figure 1 is a side view of the bolt with the nut thereon, in section. Fig. 2 is a side view of the nut; and Fig. 3 shows the bolt and nut after being tightened.

A represents an ordinary bolt of any suitable dimensions. B is the nut screwed on the bolt. The threaded hole *b* in the nut is made on an incline, as shown, so that when screwed onto the bolt the nut will stand at an angle from the usual right-angle line. When the nut, then, is screwed up tightly against its bearing-surface the end of the bolt bends, as shown in Fig. 3, until the nut lies flat against the bearing-surface.

By this means the nut becomes locked on the bolt and cannot come off from the same, unless force is applied sufficient to bend the bolt back while unscrewing the nut.

I am fully aware that a nut having its inner face inclined for the purpose of bending the bolt is not new; hence I disclaim such as being my invention, but with such device as known to me the screw-hole in the nut is straight. It is well known that in the manufacture of nuts it is expensive and difficult to make such unless both faces are horizontal or flat. The nut I construct has both of its faces flat, and the screw opening on an incline.

Having thus fully described my invention, what I claim as new, and desire to secure by Letters Patent, is—

The nut B with parallel outer and inner faces, and provided with a screw-thread orifice, which is inclined as set forth.

In testimony that I claim the foregoing, I have hereunto set my hand this 22d day of December, 1875.

CASSIUS HOLTON.

Witnesses:
DANL. G. CLOUS,
F. M. BANKS.